United States Patent [19]

Nordine

[11] Patent Number: 5,054,586
[45] Date of Patent: Oct. 8, 1991

[54] PROTECTIVE COVER FOR SLACK ADJUSTERS

[76] Inventor: Darrell H. Nordine, 12231 Mary Ave., Anchorage, Ak. 99515

[21] Appl. No.: 496,596

[22] Filed: Mar. 21, 1990

[51] Int. Cl.⁵ .................... F16D 65/42; F16D 65/46
[52] U.S. Cl. .................. 188/79.55; 188/196 M; 188/218 A; 188/196 BA
[58] Field of Search ............. 188/2 R, 79.51, 79.55, 188/196 M, 218 A, 196 BA; 192/111

[56] References Cited

U.S. PATENT DOCUMENTS

| | | | |
|---|---|---|---|
| 3,261,433 | 7/1966 | Page | 188/196 BA |
| 3,724,607 | 4/1973 | Reinecke | 188/79.55 |
| 4,484,665 | 11/1984 | Svenson | 188/79.55 |
| 4,499,978 | 2/1985 | Norcross | 188/196 M X |
| 4,613,020 | 9/1986 | Deem | 188/196 M |
| 4,798,265 | 1/1989 | Gibas | 188/79.55 X |
| 4,809,820 | 3/1989 | Smith | 188/79.55 X |

FOREIGN PATENT DOCUMENTS 2328125 5/1977 France .
1152960 5/1969 United Kingdom ............ 188/79.55

Primary Examiner—Douglas C. Butler
Attorney, Agent, or Firm—William D. Hall

[57] ABSTRACT

A cover to enclose the adjustment screw or nut as well as to cover the locking sleeve of a brake slack adjuster. The cover is held in place by an elastic band which extends horizontally around the brake slack adjuster and has enlargements that engage the cover and hold it firmly in place against the slack adjuster. The cover is easily removable when it is desired to make adjustments, yet it fully protects the slack adjuster from unwanted elements.

20 Claims, 2 Drawing Sheets

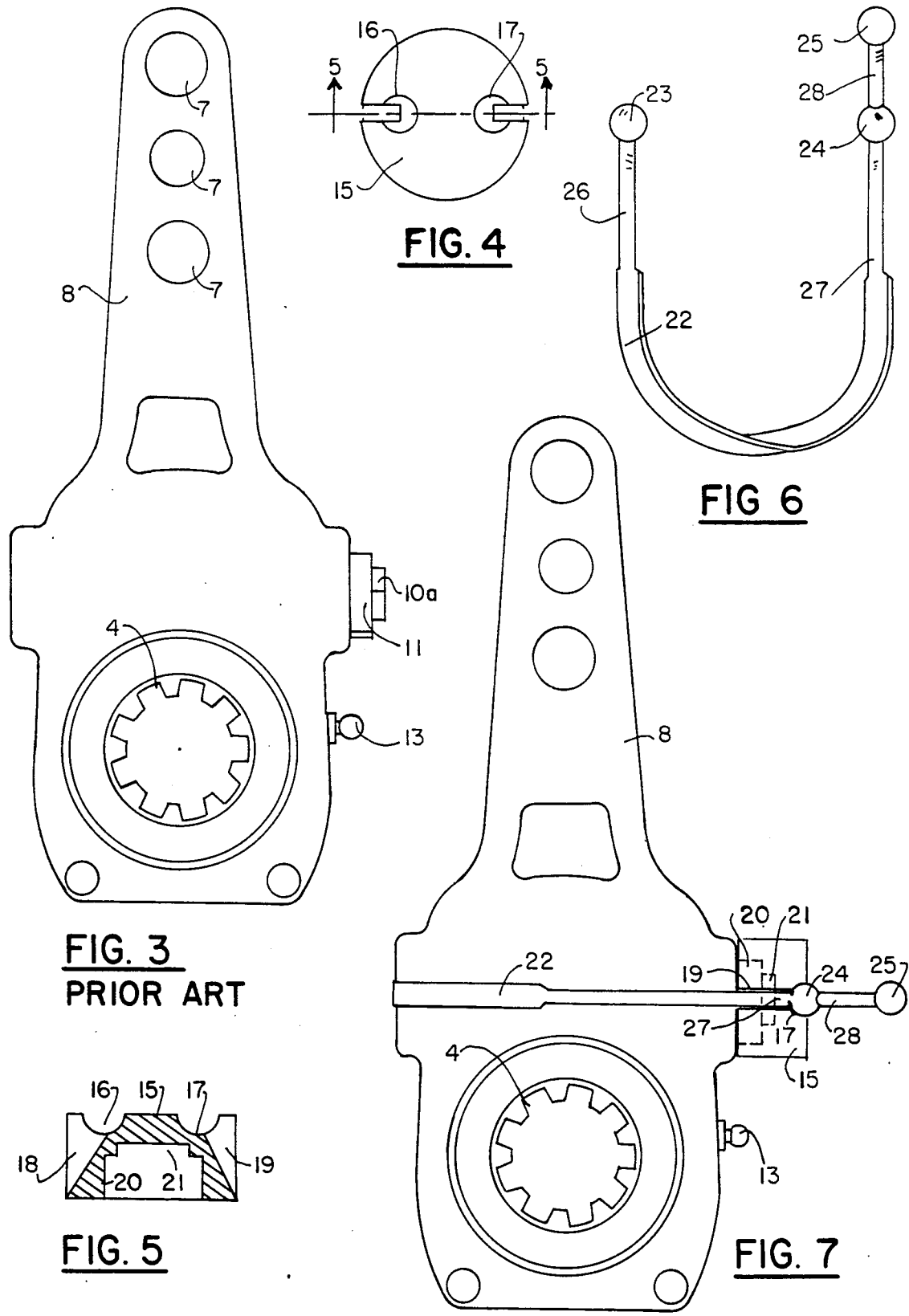

PROTECTIVE COVER FOR SLACK ADJUSTERS

BACKGROUND OF THE INVENTION

Brakes for some trucks have slack adjusters. For the purpose of describing the function and mode of operation of slack adjusters, I cite the following U.S. patents and incorporate them herein by reference:

| Page | 3,261,433 | July 19, 1966 |
| --- | --- | --- |
| Reinecke | 3,724,607 | April 3, 1973 |
| Svenson | 4,484,665 | Nov. 27, 1984 |
| Deem | 4,613,020 | Sept. 23, 1986 |
| Gibas | 4,798,265 | Jan. 17, 1989 |

There is, however a problem with slack adjusters and that is that the adjusting mechanism is often so clogged with impurities such as dust, mud, snow or ice that it will not allow adjustments to be made. The five United States patents cited in the immediately preceding paragraph provide covers for at least some of the adjustable parts.

SUMMARY OF THE INVENTION

My invention provides a cover of suitable shape to enclose the adjustment screw (or nut), as well as to cover the locking sleeve of the slack adjuster. This cover is held in place by an elastic band which extends horizontally around the slack adjuster and has enlargements that engage the cover and hold it firmly in place against the slack adjuster. The cover is easily removable when it is desired to make adjustments, yet it fully protects the slack adjuster from unwanted elements.

BRIEF DESCRIPTION OF THE DRAWINGS

FIG. 3 is an external front view of the prior art slack adjuster of FIGS. 1 and 2.

FIG. 4 is a front view of my new cover for the slack adjuster of FIGS. 1 to 3.

FIG. 5 is a cross-sectional view of my protective cover taken along the line 5—5 of FIG. 4.

FIG. 6 illustrates the elastic band of my invention for holding the protective cover of FIGS. 4 and 5 in place.

FIG. 7 shows the slack adjuster of FIG. 3 with the cover and elastic band of my invention applied thereto.

DETAILED DESCRIPTION OF THE INVENTION

Figure 1:
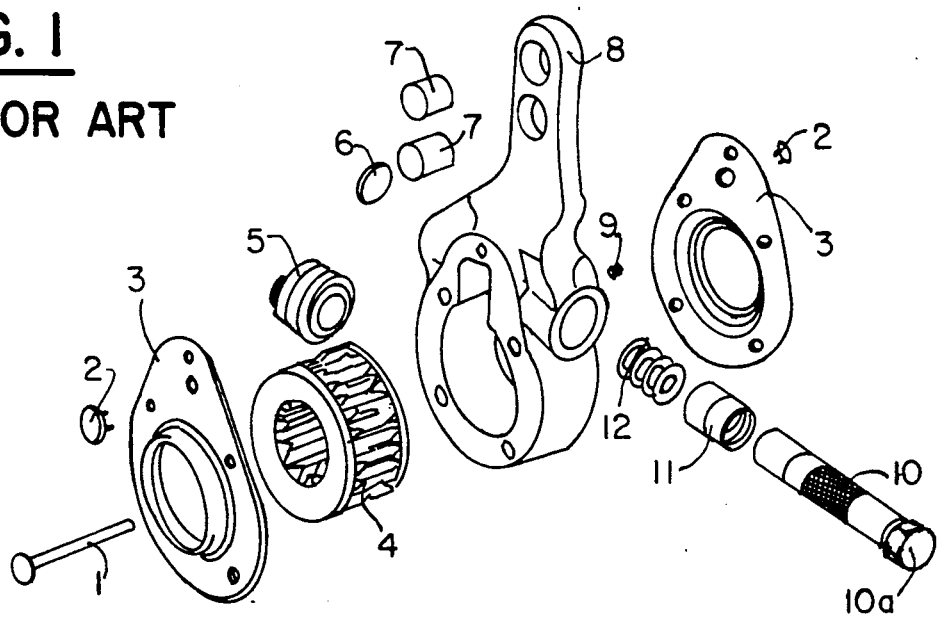
FIG. 1 is an exploded view of a typical prior art slack adjuster.
Figure 2:
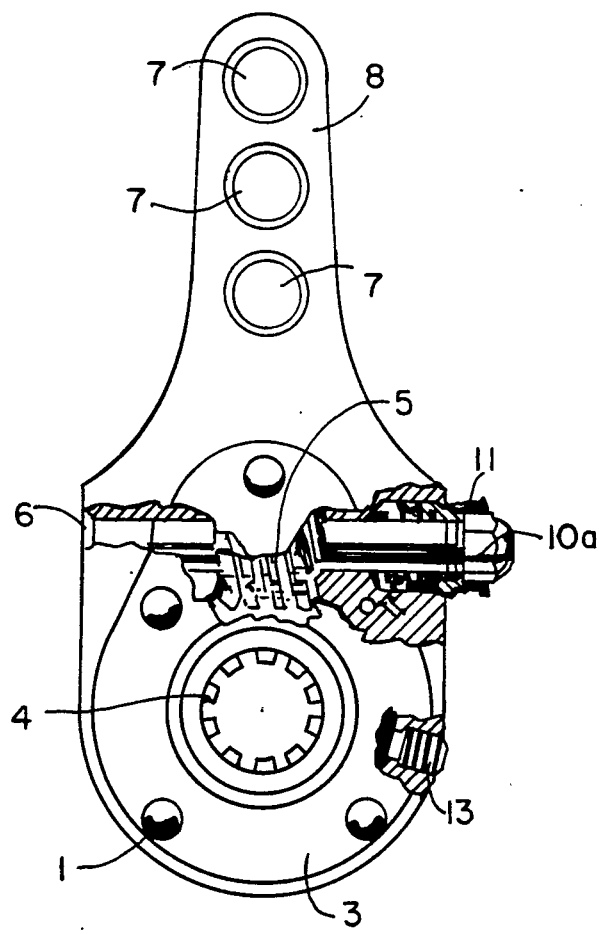
FIG. 2 is an assembly drawing of the prior art slack adjuster of FIG. 1.

The next three paragraphs of this specification describe the prior art slack adjuster of FIGS. 1 to 3 incl.

Manual slack adjusters consist of four basic elements, the body 8, the worm 5 and gear 4, and an adjusting screw 10. The gear 4 is internally splined and operates the foundation brake camshaft. Force applied to the body arm 8 is transferred through the worm 5 and gear 4 to rotate the camshaft and apply the brakes. The worm 5 is mounted on the adjusting screw 10, and when rotated alters the position of the splined gear 4 in relation to the body 8. Altering the splined gear 4 position rotates the foundation brake camshaft and spreads the brake shoes in order to compensate for lining wear.

The type of adjusting screw or wormshaft 10 used depends upon vehicle application. Slack adjusters with a light to medium duty torque rating use a positive locking mechanism consisting of a spring loaded lock sleeve 11. When released, the positive locking collar 11 engages the head 10a of the adjusting screw 10, and adjuster body 8, and prevents the adjusting screw 10 from rotating. When the sleeve 11 is pressed inwardly against the tension of spring 12 the wormshaft adjusting head 10a can be rotated to adjust the brakes. Slack adjusters with heavier torque ratings use a lock ball or plunger 9 to prevent the adjusting screw 10 from rotating. The lock 9 is generally held in place in the body 8 by a cap screw 2, and the lock engages an indent in the wormshaft 10 to prevent rotation. The head 10a of adjusting screw 10, may be designed to be rotated by a wrench or a screwdrive or both.

The slack adjuster has covers 3, held in place by rivets 1. A Welch plug 6 closes the open end of the cylindrical opening in body 8 in which adjusting screw 10 rotates. Bushings 7 are in holes in body 8 for the purpose of receiving braking force when the brakes are applied.

My invention has a protective cover 15 composed of semirigid material that has sufficient flexibility that when it is mounted on the slack adjuster 8, as shown in FIG. 7, the surface of the cover 15, that is in engagement with the body 8, tends to conform to the shape of the body 8 and seal the contents of the protective cover 15 from dust, dirt, snow, ice, etc. The body of cover 15 defines two cavities 16 and 17 that taper downwardly and outwardly as shown by slots 18 and 19, respectively, of FIG. 5. The internal cavity 20, of cover 15, is shaped to enclose the locking element 11 (FIG. 3) and the cavity 21 is shaped to receive the head 10a of the adjusting screw 10.

The elastic band 22 terminates at its left free end in an enlargement 23 which is a of a suitable size to seat itself in cavity 16. The enlargement 23 is connected to the elastic band 22 by an elastic rod-like section 26 which passes through slot 18 in the cover 15. Similarly, near the right free end of the elastic band 22 is a rod-like section 27 with an enlargement 24. The enlargement 24 seats in cavity 17 with section 27 passing through slot 19. The rod-like member 28 connects enlargements 24 and 25. Enlargement 25 may be grasped by the human hand for ease of assembly.

My protective cover 15 is mounted on the body 8 of the slack adjuster as shown in FIG. 7. With enlargement 23 seated in cavity 16, the elastic band 22 is extended around the body 8 of the slack adjuster and enlargement 24 is seated in cavity 17. The flexibilty of the cover 15 together with the pressure of the elastic band 22 causes the cover 15 to form a seal against body 8 to keep out all unwanted elements including water. The cover 15 may be easily removed to permit operation of locking sleeve 11 and the head (screw or nut) 10a. In this respect the head 10a is normally prevented from rotating by the locking sleeve 11 which is pressed outwardly by helical spring 12. After the cover 15 has been removed the locking sleeve 11 is pressed inwardly by hand to enable head 10a to be rotated. When head 10a has been suitably adjusted the locking sleeve 11 may be released so that adjusting screw 10 can not rotate. My cover 15 may then be easily replaced.

My cover 15 not only protects the head 10a from the elements but also protects locking sleeve 11. Frequently, without my invention, the locking sleeve becomes so infested with dirt as to thus render the adjusting screw 10 inoperative. My invention overcomes this problem.

I claim to have invented:

1. A protective cover for a brake slack adjuster that has a body with a slack adjusting element associated with said body, comprising:

cover means for covering said element to protect it, and elongated means, including an elastic element, extending, from said cover means around said body and back to said cover means, for holding said cover means in a position wherein it protects said slack adjusting element from contaminants, said elastic element pulling said cover means against said body, said elongated means having at least one removal connection for connecting said elongated means to said cover means.

2. Apparatus as defined in claim 1 wherein said slack adjuster includes locking means for locking said adjusting element in position, said cover means protecting both said adjusting element and said locking means.

3. Apparatus as defined in claim 1 in which:

said cover means sealing said adjusting element from contaminants.

4. Apparatus as defined in claim 3 in which said cover means seals both said adjusting element and said locking means from contaminants.

5. Apparatus as defined in claim 4 in which said cover means comprises a cup-shaped device of limited flexibility to form a seal against said body.

6. Apparatus as defined in claim 5 in which said cup-shaped device has a base and a wall terminating in an open end, said wall, at said open end, mating with said body to form a seal, said base defining at least one cavity, said elongated means being connected at one end to said cover means and having an enlargement that is held in said cavity, said elongated means extending from said one end around said body to said cavity.

7. Apparatus as defined in claim 6, in which said body defines a slot extending in said wall, and from said cavity, for receiving said elongated means.

8. A protective cover as defined in claim 1 in which said cover means is an inverted cup having a base, a cavity in said base, said elongated means including an enlargement which may be inserted in said cavity to hold the cover means in place on said body.

9. A protective cover as defined in claim 1 in which said cover means has cavities and said elongated means has two enlargements, one for each cavity, for holding said cover means in place on said body.

10. A protective cover as defined in claim 9, in which each cavity has a slot, in a cup, for receiving the elongated means that extends to such cavity.

11. In a brake slack adjuster having a body, and adjusting means:

protective cover means for protecting said adjusting means for contaminants, and elongated means, including an elastic element, having two ends connected to said protective cover means with the remainder of the elongated means extending around said body, for utilizing said elastic element to press said protective cover means toward said body, at least one of said two ends being removably connected to said protective cover means.

12. In a slack adjuster as defined in claim 11, said protective cover means and said elongated means including means for connecting the elongated means to the protective cover means.

13. In a slack adjuster as defined in claim 11, said slack adjuster having a body, said adjusting means protruding out of said body, said protective cover means having a cavity for receiving said adjusting means.

14. In a slack adjuster as defined in claim 11, said slack adjuster having a body, said adjusting means including an adjusting screw and a locking member both protruding from a cavity, said protective cover means being cup-shaped with a base and a wall extending from said base, said wall surrounding said adjusting means and mating with said body to prevent entry of contaminants to said adjusting means.

15. In a brake slack adjuster having a body, and adjusting means:

protective cover means for protecting said adjusting means from contaminants, and elongated means, including an elastic element, for engaging said body and said protective cover means and for utilizing said elastic element to press said protective cover means toward said body, said protective cover means defining at least one opening, said elongated means extending through and engaging said protective cover means adjacent to said opening for connecting said elongated means to said protective cover means.

16. In a brake slack adjuster having a body, and adjusting means:

protective cover means for protecting said adjusting means from contaminants, and elongated means, including an elastic element, for engaging said body and said protective cover means and for utilizing said elastic element to press said protective cover means toward said body, said elongated means including means for attachment to, and detachment from, said protective cover means.

17. In a brake slack adjuster having a body, and adjusting means:

protective cover means for protecting said adjusting means from contaminants, and elongated means, including an elastic element, for engaging said body and said protective cover means and for utilizing said elastic element to press said protective means toward said body, said adjusting means including an adjusting screw and a locking member both protruding from a cavity, said protective cover means being cup-shaped with a base and a wall extending from said base, said wall surrounding said adjusting means and mating with said body to prevent entry of contaminants to said adjusting means, said base defining a cavity, said elongated means having an enlargement that fits in said cavity and secures the elongated means to said protective cover means.

18. In a slack adjuster as defined in claim 17:

said wall defining a slot opening into said cavity for receiving said elongated means.

19. In a brake slack adjuster having a body, and adjusting means:
protective cover means for protecting said adjusting means from contaminants, and
elongated means, including an elastic element, for engaging said body and said protective cover means and for utilizing said elastic element to press said protective cover means toward said body,
said adjusting means including an adjusting screw and a locking sleeve both protruding from said body,
said protective cover means comprising a cup-shaped device having a base and also having a wall mating with said body and extending around said protruding adjustment means,
said base defining first and second cavities,
first and second slots in said wall entering said first and second cavities respectively,
said elongated means having an enlargement in the first one of said cavities,
said elongated means passing through said first slot, around said body and then through said second slot to said second cavity,
said elongated means having an enlargement in said second cavity.

20. The method of protecting the adjustment means of a brake slack adjuster from unwanted elements, comprising:
providing a protective cover for said adjustment means,
providing an elongated element, at least a portion of which is elastic, and extending said elongated element around said slack adjuster, and
connecting said elongated element to said protective cover so that the elasticity of said elongated element will bias said protective cover against said slack adjuster to seal said adjustment means from contaminants.

* * * * *